United States Patent
Matsubayashi et al.

(10) Patent No.: US 9,520,761 B2
(45) Date of Patent: Dec. 13, 2016

(54) PRODUCTION METHOD FOR LAMINATED IRON CORE

(71) Applicant: MITSUI HIGH-TEC, INC., Kitakyushu-shi, Fukuoka (JP)

(72) Inventors: Satoshi Matsubayashi, Fukuoka (JP); Yukio Matsunaga, Fukuoka (JP); Iwao Myojin, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 0 days.

(21) Appl. No.: 14/435,910

(22) PCT Filed: Oct. 16, 2013

(86) PCT No.: PCT/JP2013/078074
§ 371 (c)(1),
(2) Date: Apr. 15, 2015

(87) PCT Pub. No.: WO2014/065174
PCT Pub. Date: May 1, 2014

(65) Prior Publication Data
US 2015/0270762 A1    Sep. 24, 2015

(30) Foreign Application Priority Data

Oct. 23, 2012    (JP) ................................ 2012-233832

(51) Int. Cl.
*H02K 15/00* (2006.01)
*B21D 15/00* (2006.01)
(Continued)

(52) U.S. Cl.
CPC ............... *H02K 15/02* (2013.01); *H02K 1/18* (2013.01); *H02K 1/28* (2013.01); *H02K 15/03* (2013.01);
(Continued)

(58) Field of Classification Search
CPC .......... H02K 1/148; H02K 1/141; H02K 1/17; H02K 1/18; H02K 1/28; H02K 15/02; H02K 15/03; H02K 2201/09; B21D 28/22; Y10T 29/49009; Y10T 29/49012; Y10T 29/49908; Y10T 29/49915; Y10T 29/49936; Y10T 156/1077
See application file for complete search history.

(56) References Cited

U.S. PATENT DOCUMENTS

| | | | | |
|---|---|---|---|---|
| 6,759,785 B2 * | 7/2004 | Miyake | .................... | H02K 1/14 310/254.1 |
| 6,784,587 B2 * | 8/2004 | Miyake | .................... | H02K 1/14 310/216.001 |

(Continued)

FOREIGN PATENT DOCUMENTS

| | | |
|---|---|---|
| DE | 3027987 A1 | 2/1982 |
| DE | 102004008567 | 9/2005 |

(Continued)

OTHER PUBLICATIONS

International Search Report with English language translation in Application No. PCT/JP2013/078074, mail date is Jan. 21, 2014.
(Continued)

*Primary Examiner* — Essama Omgba
(74) *Attorney, Agent, or Firm* — Greenblum & Bernstein, P.L.C.

(57) ABSTRACT

A production method for the laminated iron core includes a first process that segment iron core pieces which respectively have circular arc angles obtained by dividing 360° as an angle of circumference into m are separated from a belt shaped iron core material and mounted on a mount base, the segment iron core pieces are carried to a laminating position of a rotary laminating mechanism by a pusher and the rotary laminating mechanism including the carried segment iron
(Continued)

core piece therein is rotated by 360°/m and a second process that the first process is repeated to form an annularly connected iron core piece in which the segment iron core pieces are annularly arranged. The second process is repeated to form a caulked and laminated iron core having a prescribed thickness. During the second process, the segment iron core pieces are caulked and laminated in the rotary laminating mechanism.

13 Claims, 6 Drawing Sheets

(51) Int. Cl.
  *H02K 15/02* (2006.01)
  *H02K 1/18* (2006.01)
  *H02K 1/28* (2006.01)
  *H02K 15/03* (2006.01)
  *B21D 28/22* (2006.01)

(52) U.S. Cl.
  CPC ........... *B21D 28/22* (2013.01); *H02K 2201/09* (2013.01); *Y10T 29/49009* (2015.01); *Y10T 29/49012* (2015.01); *Y10T 29/49908* (2015.01); *Y10T 156/10* (2015.01); *Y10T 156/1064* (2015.01); *Y10T 156/1077* (2015.01)

(56) References Cited

U.S. PATENT DOCUMENTS

| | | | | |
|---|---|---|---|---|
| 7,185,418 | B2* | 3/2007 | Miyake | H02K 1/14 29/596 |
| 7,777,387 | B2* | 8/2010 | Nagai | H02K 15/022 29/596 |
| 7,847,466 | B2* | 12/2010 | Nagai | H02K 1/148 310/216.004 |
| 7,893,591 | B2* | 2/2011 | Myojin | H02K 1/276 310/156.53 |
| 7,928,627 | B2* | 4/2011 | Nagai | H02K 15/022 29/596 |
| 8,042,257 | B2* | 10/2011 | Kojima | H02K 15/022 29/598 |
| 8,106,561 | B2* | 1/2012 | Myojin | H02K 1/148 29/596 |
| 8,127,429 | B2* | 3/2012 | Saito | B21D 28/22 29/596 |
| 8,268,219 | B2* | 9/2012 | Matsubayashi | H02K 15/12 264/272.2 |
| 8,850,937 | B2* | 10/2014 | Kaiser | H02K 15/02 83/255 |
| 9,099,897 | B2* | 8/2015 | Neuenschwander | B23P 11/005 |
| 2001/0037552 | A1 | 11/2001 | Bareis et al. | |
| 2003/0066183 | A1* | 4/2003 | Nouzumi | H02K 1/148 29/596 |
| 2003/0127938 | A1* | 7/2003 | Shen | H02K 15/026 310/216.043 |
| 2007/0214632 | A1* | 9/2007 | Kojima | H02K 15/022 29/596 |
| 2010/0001612 | A1* | 1/2010 | Nagai | H02K 15/022 310/216.043 |
| 2010/0052463 | A1* | 3/2010 | Saito | B21D 28/22 310/216.001 |
| 2010/0270888 | A1* | 10/2010 | Nagai | H02K 15/022 310/216.043 |
| 2013/0154434 | A1* | 6/2013 | Hasegawa | H02K 1/16 310/216.004 |
| 2013/0160622 | A1 | 6/2013 | Shigematsu et al. | |
| 2013/0249346 | A1 | 9/2013 | Nagai et al. | |
| 2015/0222151 | A1* | 8/2015 | Semken | H02K 1/148 310/216.008 |
| 2015/0270762 | A1* | 9/2015 | Matsubayashi | H02K 15/02 156/257 |

FOREIGN PATENT DOCUMENTS

| | | | |
|---|---|---|---|
| FR | 2 487 597 A1 | | 1/1982 |
| JP | 63-80741 A | | 4/1988 |
| JP | 6-22508 A | | 1/1994 |
| JP | 6-61413 U | | 8/1994 |
| JP | 07015924 A | * | 1/1995 |
| JP | 07143706 A | * | 6/1995 |
| JP | 2004-136361 A | | 5/2004 |
| JP | 2005-20972 A | | 1/2005 |
| JP | 3634801 B2 | | 1/2005 |
| JP | 2009-131075 A | | 6/2009 |
| JP | 2009-273202 A | | 11/2009 |
| JP | 2012-95369 A | | 5/2012 |
| JP | 2012125149 A | * | 6/2012 |
| JP | 2013005628 A | * | 1/2013 |

OTHER PUBLICATIONS

Office Action in Chinese Application No. 201380055644.4 dated Sep. 2, 2016, with English language translation.

* cited by examiner

PRODUCTION METHOD FOR LAMINATED IRON CORE

TECHNICAL FIELD

The present invention relates to a production method for a laminated iron core (a laminated iron core for a rotor or a laminated iron core for a stator) by a segment iron core piece laminating method in which a die can be miniaturized and a press speed can be improved.

BACKGROUND ART

Usually, a motor core formed with a laminated iron core is known which has several tens to several hundreds of annular thin sheet members laminated that are obtained by press working electromagnetic steel plates. The thickness of the thin sheet member is about 0.15 to 0.5 mm. As the thickness of the sheet member is smaller, an energy effect is supposed to be the better. Further, in order to improve a yield rate, a laminated iron core is also known which is manufactured in such a way that circular arc shaped thin sheet members obtained by dividing the annular thin sheet member into a plurality of pieces are combined together.

For instance, Patent Literature 1 discloses a device by which one annular thin sheet member is formed by a plurality of circular arc shaped segment iron core pieces and many thin sheet members formed in such a way are laminated to manufacture a laminated iron core. A central angle of the circular arc shaped segment iron core piece is 360°/p. One annular thin sheet member is formed by p pieces of segment iron core pieces. In the annular thin sheet members in layers which are respectively adjacent in a vertical direction, the circular arc shaped segment iron core pieces which respectively form the thin sheet members are laminated in such a way that their connected positions shift in the circumferential direction as if bricks were stacked.

Patent Literature 2 discloses such a manufacturing device as described below. Namely, the manufacturing device forms segment iron core pieces by a half cutting work and a plane press work when the manufacturing device manufactures an annular laminated iron core in which layers are respectively formed with a plurality of segment iron core pieces (circular arc shaped members). Then, the segment iron core pieces which are pressed back are pushed down to separate the segment iron core pieces from an iron core material (a thin sheet material). Every time that the separation is carried out, the separated segment iron core piece is arranged in a desired position of the laminated iron core and the laminated iron core is rotated by a prescribed angle to an arranged position of a next segment iron core piece. These operations are repeated to complete the laminated iron core.

CITATION LIST

Patent Literature

Patent Literature 1: Japanese Patent No. 3634801
Patent Literature 2: JP-A-2012-95369
Patent Literature 3: JP-A-63-080741

SUMMARY OF INVENTION

Technical Problem

However, in the manufacturing device for the laminated iron core disclosed in Patent Literature 1, the segment iron core pieces need to be cut and separated from the thin sheet member to a matrix by a cutting work and a positioning of a rotating position of the matrix needs to be controlled with a high accuracy at the same time in a final process. Accordingly, a positioning control of the thin sheet member and the matrix is complicated, so that a die is enlarged. Thus, since a press device is also enlarged, a cost of the device is increased, so that a cost of a product is finally high.

In the manufacturing device disclosed in Patent Literature 2, the segment iron core piece formed by pressing it back to the iron core material may be pushed down to separate the segment iron core piece from the iron core material and the segment iron core piece may be merely delivered to a lamination guide in a final process. Accordingly, a feed pitch of the iron core material and the positioning operation of a rotating die do not need to be controlled with a high accuracy at the same time as in the technique disclosed in Patent Literature 1. Therefore, the final process can be simply controlled. However, like Patent Literature 1, since a segment iron core piece continuous body forming process and a laminating process are carried out in the same die, the die is enlarged. Consequently, the press device is also enlarged. Thus, the cost of the device and the cost of the product are increased.

Patent Literature 3 discloses a method for forming a laminated iron core of a stator in which, outside a die forming an iron core material which has a tooth part in one end and a base part in the other end, the iron core material is cut for each roll, the cut end parts of the iron core material are connected together to form a ring shaped connection body, and the plurality of ring shaped connection bodies are laminated and fixed.

According to this manufacturing method, a process that the iron core material is formed is carried out in a die which is different from a die in which processes the iron core material is cut for each roll and the ring shaped connection bodies are laminated are carried out. Thus, the die and the press device can be avoided from being enlarged. However, since the iron core material is cut for each roll, the cut part is located merely in one position. Accordingly, a problem arises that a stress is concentrated on the one position, so that the ring shaped connection bodies cannot maintain their circularity.

The present invention is devised by considering the above-described circumstances and it is an object of the present invention to provide a production method for a laminated iron core in which segment iron core pieces are laminated in annular forms outside a die that manufactures the segment iron core pieces so that a device may be more miniaturized and a press speed may be improved.

A production method for a laminated iron core according to a first aspect of the present invention includes: a mounting process that a plurality of segment iron core pieces which respectively have caulking parts and n pieces of magnetic pole parts formed at a pitch angle of $\theta°$ and respectively have circular arc angles obtained by dividing 360° as an angle of circumference into m are separated from a belt shaped iron core material and mounted on a mount base; a carrying process that the segment iron core pieces mounted on the mount base are carried one piece by one piece to a designated position in a rotary laminating mechanism by a pusher; a first rotating process that the rotary laminating mechanism including the segment iron core piece therein is rotated by 360°/m; a forming process that the mounting process, the carrying process and the first rotating process are repeated m times to form an annularly connected iron core piece in which m pieces of the segment iron core pieces are annularly arranged; and a caulking and laminating process that during the forming process, the caulking part of the segment iron core piece is caulked to laminate the segment iron core piece on the segment iron core piece adjacent in a direction of lamination, wherein the forming process is repeated to form a caulked and laminated iron core having a prescribed thickness, where m and n are integers of 2 or larger, and θ·n·m=360°.

A production method for the laminated iron core according to a second aspect is configured by the production method for the laminated iron core according to the first aspect, further including: a second rotating process that the rotary laminating mechanism on which the annularly connected iron core piece is mounted is rotated by θ·ro, wherein the forming process and the second rotating process are repeated to form the caulked and laminated iron core having the prescribed thickness, where r is a natural number and is not a number integer times as large as n.

A production method for the laminated iron core according to a third aspect is configured by the production method for the laminated iron core according to the first or second aspect, wherein the caulking and laminating process is carried out after the carrying process to caulk and laminate the segment iron core piece before the carried segment iron core piece is rotated by the first rotating process.

A production method for the laminated iron core according to a fourth aspect is configured by the production method for the laminated iron core according to the first or second aspect, wherein in the caulking and laminating process, the segment iron core piece is caulked and laminated in a position different from the position where the segment iron core piece is carried in the carrying process.

A production method for the laminated iron core according to a fifth aspect is configured by the production method for the laminated iron core according to the fourth aspect, wherein in the caulking and laminating process, the segment iron core piece which is rotated k times in the rotary laminating mechanism in the first rotating process is caulked and laminated, where k indicates a natural number and satisfies 1≤k<m.

A production method for the laminated iron core according to a sixth aspect is configured by the production method for the laminated iron core according to the fourth or fifth aspect, wherein while a first segment iron core piece is carried in the carrying process, a second segment iron core piece is caulked and laminated in a position different from the position where the second segment iron core piece is carried in the rotary laminating mechanism in the caulking and laminating process.

A production method for the laminated iron core according to a seventh aspect is configured by the production method for the laminated iron core according to any one of the first to sixth aspects, wherein the rotary laminating mechanism is provided with an inside diameter guide member which determines an inside diameter of the laminated iron core, and the segment iron core piece is pushed by the pusher to abut on the inside diameter guide member and the segment iron core piece is carried to a laminating position of the rotary laminating mechanism.

A production method for the laminated iron core according to an eighth aspect is configured by the production method for the laminated iron core according to the seventh aspect, wherein a recessed part or a protruding part is formed in an inner peripheral side of the segment iron core piece, and a protruding part or a recessed part corresponding to the recessed part or the protruding part of the segment iron core piece is formed in the inside diameter guide member.

A production method for the laminated iron core according to a ninth aspect is configured by the production method for the laminated iron core according to any one of the first to eighth aspects, wherein before the mounting process, a longitudinal direction of the segment iron core piece is allowed to correspond to a direction of width of the belt shaped iron core material, and then, the segment iron core piece is half cut, pressed back and held by an outer frame of the belt shaped iron core material, and in the mounting process, the segment iron core piece is carried to an upper position of the mount base, separated from the belt shaped iron core material and blanked off onto the mount base.

A production method for the laminated iron core according to a tenth aspect is configured by the production method for the laminated iron core according to the ninth aspect, wherein the outer frame from which the segment iron core piece is blanked off is cut to scraps by a scrap cutter and discharged outside a system.

A production method for the laminated iron core according to an eleventh aspect is configured by the production method for the laminated iron core according to any one of the first to eighth aspects, wherein the belt shaped iron core material is formed by connecting a plurality of segment iron core pieces together with connecting parts, and the belt shaped iron core material is carried to a part just above the mount base and cut at the connecting parts, so that the segment iron core pieces are separated from the belt shaped iron core piece and arranged on the mount base.

A production method for the laminated iron core according to a twelfth aspect is configured by the production method for the laminated iron core according to the eleventh aspect, wherein a feeding direction of the segment iron core piece by the pusher intersects at right angles to a feeding direction of the belt shaped iron core material.

A production method for the laminated iron core according to a thirteenth aspect is configured by the production method for the laminated iron core according to the eleventh or twelfth aspect, wherein the belt shaped iron core material is wound on a reel.

Advantageous Effects of Invention

The production method for the laminated iron core according to the present invention has below-described advantageous effects.

(1) In the conventional technique, since the die in which the segment iron core pieces are laminated and the die in which the segment iron core pieces are formed are the same, the die is enlarged and the cost of the device is high. However, in the present invention, since the process that forms the iron core pieces (namely, a molding die) is carried out outside the die that laminates the segment iron core pieces, the dies can be respectively miniaturized and the cost of the device can be reduced.

(2) Further, one laminating (a manufacturing device for the laminated iron core) can cope with the segment iron core pieces of a plurality of different configurations, so that the laminating devices do not need to be individually prepared.

(3) In the conventional device, since the laminating process is carried out in the same die as that of the process which forms the segment iron core pieces, a press speed cannot be improved. However, in the present invention, since the process which forms the segment iron core pieces is carried out outside a die which laminates the segment iron core pieces, the press speed can be improved.

(4) In the laminated iron core manufactured by the production method for the laminated iron core, since connected parts of the adjacent segment iron core pieces are separated from each other in comparison with a coil shaped core, a stress is dispersed, so that a circularity of the core is improved.

DESCRIPTION OF EMBODIMENTS

Subsequently, embodiments which embody the present invention will be described below by referring the accompanying drawings.

First Embodiment

Figure 1:
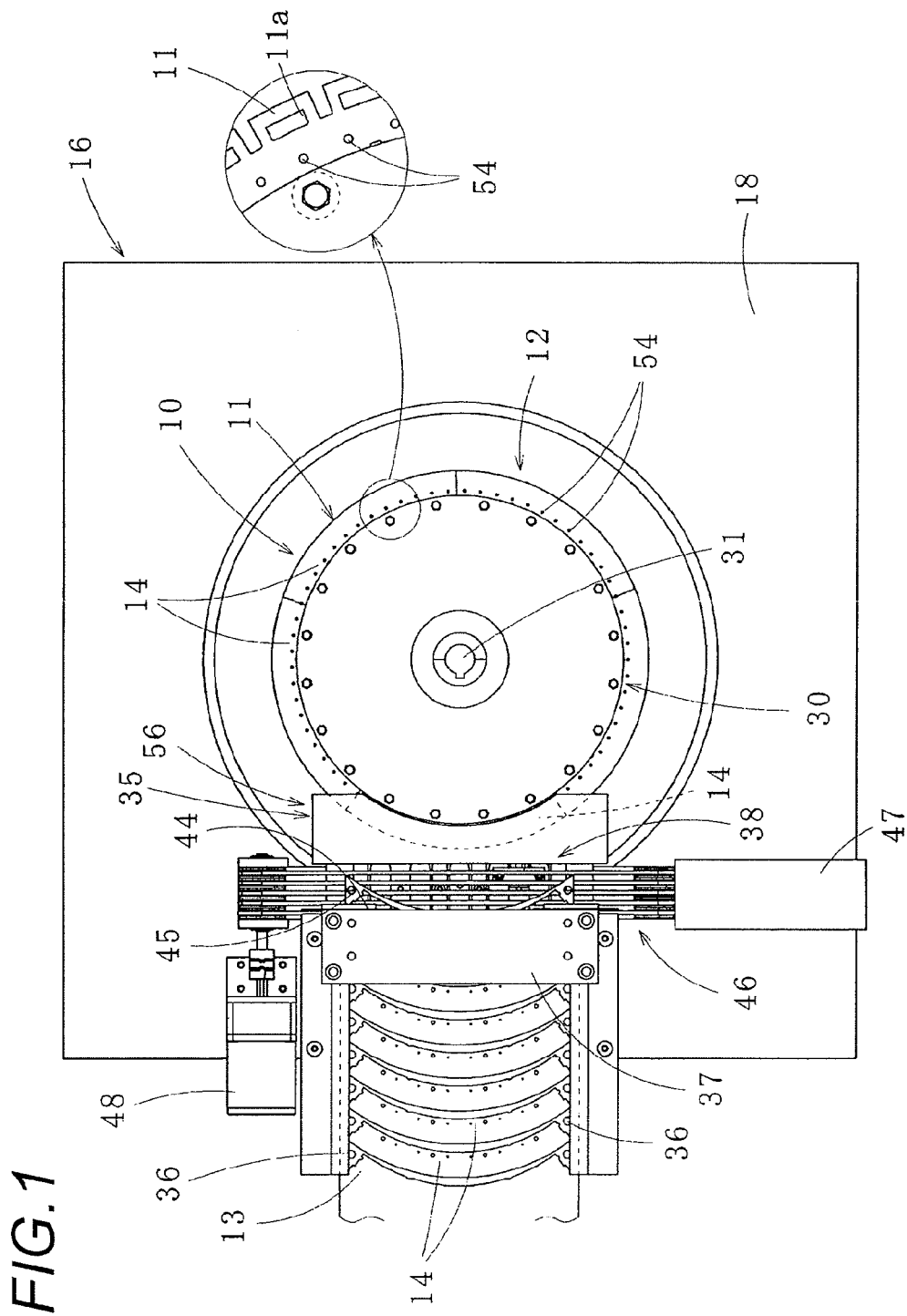
FIG. 1 is a plan view showing a main structure of a manufacturing device for a laminated iron core to which a production method for the laminated iron core according to a first embodiment of the present invention is applied.

As shown in FIG. 1, a laminated iron core 10 to which a production method for a laminated iron core according to a first embodiment of the present invention is applied has many magnetic pole parts 11 in an outer side of a radial direction. The adjacent magnetic pole parts 11 are formed at a pitch angle of $\theta°$. An annularly connected iron core piece 12 having an angle of 360° (an angle of circumference) of one round is equally divided into a plurality (m pieces) of segment iron core pieces 14. Namely, one segment iron core piece 14 has n pieces of magnetic pole parts 11, so that $\theta \cdot n \cdot m = 360°$. In the present embodiment, the magnetic pole parts 11 are provided in the outer side of the radial direction; however, the laminated iron core may have magnetic pole parts formed in an inner side of the radial direction. Further, m and n are integers of 2 or larger. In each of the magnetic pole parts 11, a magnet insert hole 11a is formed.

In the laminated iron core 10, the segment iron core piece 14 is formed from a belt shaped iron core material 13 made of a thin magnetic steel plate and m pieces (five pieces in this embodiment) of segment iron core pieces 14 are used to form one annularly connected iron core piece 12. The prescribed number of annularly connected iron core pieces 12 are caulked and laminated to form the laminated iron core 10 having a prescribed thickness. The segment iron core pieces 14 which are adjacent in the circumferential direction are connected together in connecting parts. When the connecting parts are located at the positions of the same angle of circumference in a direction of lamination (a vertical direction), the laminated iron core is readily disassembled after the laminated iron core is assembled. Accordingly, the annularly connected iron core pieces are laminated in such a way that positions of the connecting parts for one or the plurality of annularly connected iron core pieces 12 which are adjacent in the vertical direction are shifted by $\theta \cdot r°$. Here, r is a natural number and is not integer times as large as n. However, when such a treatment as not to disassemble the laminated iron core 10 is separately applied after the laminated iron core is assembled or when the laminated iron core 10 may be disassembled after the laminated iron core is assembled, a process is not necessarily carried out that the annularly connected iron core pieces are laminated in such a way that the connecting positions are shifted by $\theta \cdot r°$.

Figure 2:
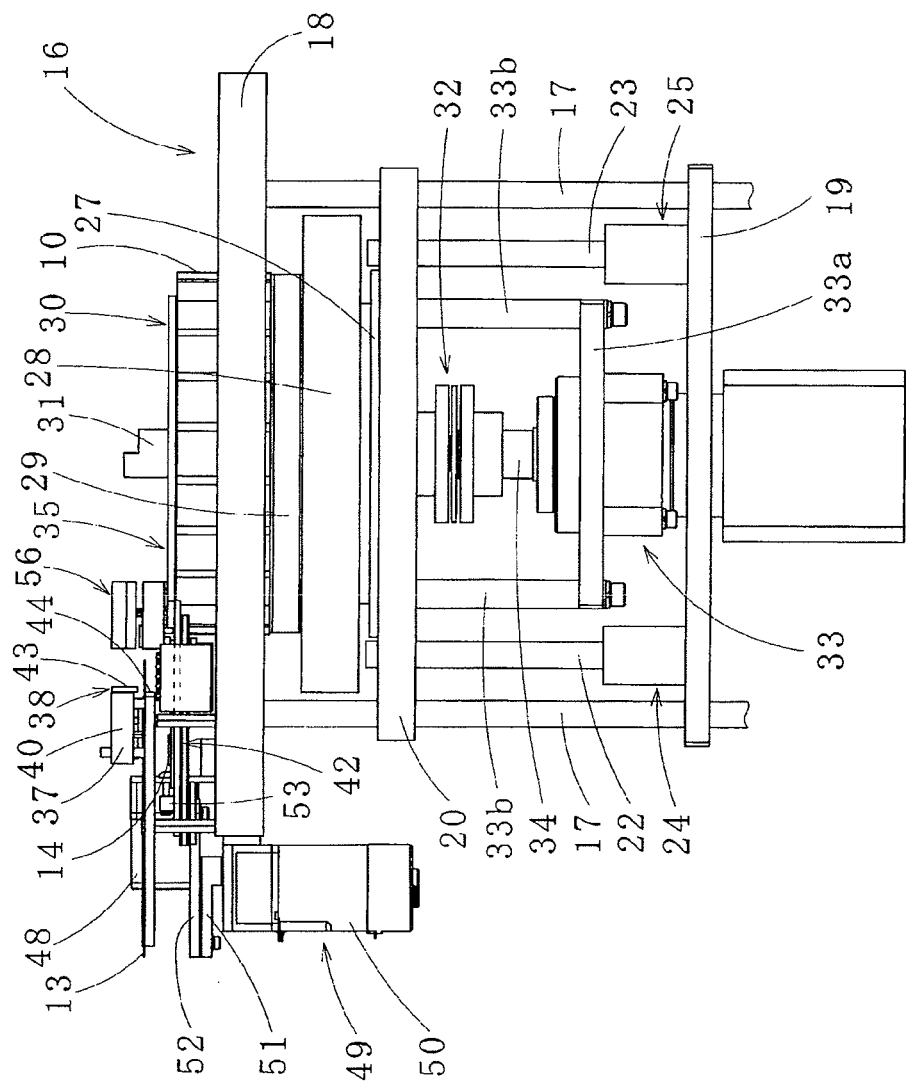
FIG. 2 is a side view showing the main structure of the manufacturing device for the laminated iron core.
Figure 3:
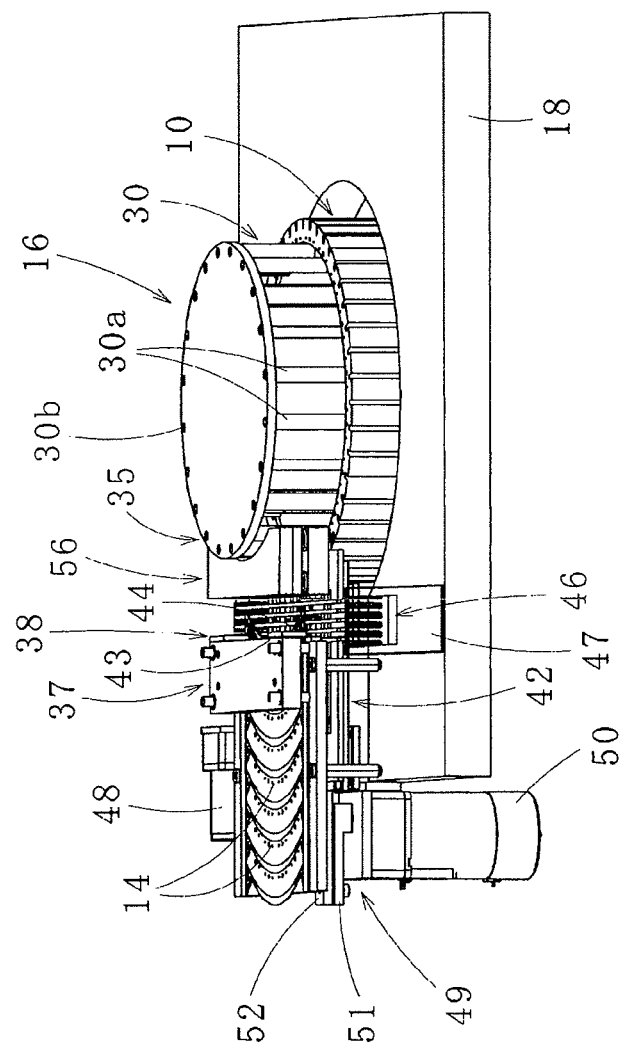
FIG. 3 is a perspective view of the manufacturing device for the laminated iron core.

Now, by referring to FIG. 1 to FIG. 3, a manufacturing device 16 for the laminated iron core will be described below. As shown in FIGS. 1 and 2, the manufacturing device 16 for the laminated iron core includes a rotary laminating mechanism 35 and a caulking die 56 which are respectively independent. The manufacturing device 16 for the laminated iron core includes a base plate 18 and a lower plate 19 peripheries of which are held by four cylindrical support members 17. The base plate 18 and the lower plate 19 are fixed and arranged in a support frame not shown in the drawing. In the four support members 17, a lifting and lowering plate 20 is provided between the base plate 18 and the lower plate 19 so as to be lifted and lowered.

To both sides of the lifting and lowering plate 20, upper parts of a pair of right and left lifting and lowering rods 22 and 23 are fixed. In lower parts of the lifting and lowering rods 22 and 23, lifting and lowering units 24 and 25 are provided. The lifting and lowering units 24 and 25 have driving motors therein. The driving motors are synchronously driven to synchronously lift and lower the right and left lifting and lowering rods 22 and 23. Thus, the lifting and lowering plate 20 is lifted and lowered by holding its horizontal state.

In the lifting and lowering plate 20, a rotary plate 28 is provided through a bearing 27. On the rotary plate 28, a core mount base 29 is mounted with its axis aligned. In the core mount base 29, an inside diameter guide member 30 is provided. The inside diameter guide member 30 determines an inside diameter of the laminated iron core 10. The inside diameter guide member 30 abuts on the segment iron core piece 14 in a state where the segment iron core piece 14 is independent. On the other hand, when the segment iron core pieces 14 are connected together to form the annularly connected iron core piece 12, a slight gap is formed between the inside diameter guide member 30 and the annularly connected iron core piece 12. The inside diameter guide member 30 includes a plurality of rod materials 30a which are arranged on the same circumference and allowed to stand upright and a disk 30b connected to upper ends of the rod materials 30a.

Further, on the rotary plate 28, a shaft 31 is provided and connected to an output shaft 34 of a rotating motor 33 in a lower part by a coupling 32. The rotating motor 33 is fixed to the lifting and lowering plate 20 by a support plate 33a and a plurality of support rods 33b. Accordingly, when the rotating motor 33 is driven, the rotary plate 28 is rotated. When the lifting and lowering units 24 and 25 are driven, the lifting and lowering plate 20 is lifted and lowered. Since servo motors are respectively used for these motors, the laminated iron core 10 (including a laminated iron core which is now assembled) mounted on the core mount base 29 is rotated by a prescribed angle to lift or lower the laminated iron core to a prescribed height. The above-described members and the above-described inside diameter guide member 30 form the rotary laminating mechanism 35 which sequentially rotates and laminates the segment iron core pieces 14. In the lower plate 19, a through hole (not shown in the drawing) is formed through which the rotating motor 33 can be freely lifted and lowered.

The core mount base 29 is provided with a position of an axis of the shaft 31 taken as a center. In an outer side position of the core mount base 29, a carrying unit not shown in the drawing is provided which sequentially carries the segment iron core pieces 14 formed in the belt plate iron core material 13 to prescribed positions. In the belt shaped iron core material 13, many segment iron core pieces 14 are arranged with slight gaps formed in such a way that a longitudinal direction of the segment iron core piece 14 is allowed to correspond to a direction of width of the belt shaped iron core material 13. The segment iron core piece 14 is half cut by a first press relative to the belt shaped iron core material 13 and pressed back to the belt shaped iron core material 13 by a second press. Thus, the segment iron core piece 14 is connected to an outer frame (a skeleton) of the belt shaped iron core material 13 in a state where a periphery of the segment iron core piece 14 can be easily separated.

The belt shaped iron core material 13 which has the segment iron core pieces 14 so as to be separated is fed to a thrust down jig 37 and a scrap cutter 38 by the above-described carrying unit by the use of pilot holes 36 provided in both sides in the longitudinal direction. The thrust down jig 37 has a block 40 to thrust down (blank off) the segment iron core piece 14 on a mount base 42.

The outer frame of the belt shaped iron core material 13 from which the segment iron core piece 14 is thrust down is cut short by the scrap cutter 38 having shearing blades 43 and 44 to become scraps 45. The scraps 45 are dropped on a discharge conveyor 46 and discharged outside a system by a shooter 47 connected thereto. A motor 48 drives the discharge conveyor 46. Further, after the segment iron core piece 14 is thrust down in the block 40, the outer frame of the belt shaped iron core material 13 is conveyed by a prescribed distance so as to be mounted on the scrap cutter 38. Since the block 40 may be sufficiently formed to merely thrust down the segment iron core piece 14, the block may be smaller than the segment iron core piece 14 and does not need to have the same form as that of the segment iron core piece 14.

In the manufacturing device 16 for the laminated iron core, a pusher 49 is provided which conveys the segment iron core piece 14 mounted on the mount base 42 to a prescribed position of the rotary laminating mechanism 35. The pusher 49 includes a decelerating motor 50 which is rotated and driven, an arm 51 provided in the decelerating motor 50, a moving forward and backward member 52 provided in an end part of the arm 51 and an iron core piece push out member 53 which is moved forward and backward by the moving forward and backward member 52. The pusher 49 pushes from a rear part both sides of the segment iron core piece 14 in the longitudinal direction which is thrust down on the mount base 42 to convey the segment iron core piece 14 to a position of a prescribed angle of the laminated iron core 10 which is provided on the core mount base 29 mounted on the rotary plate 28 and now assembled.

Here, when the one or the plurality of segment iron core pieces 14 do not form the annularly connected iron core piece 12, the position of the prescribed angle of the laminated iron core 10 indicates a position where an initial end part of the segment iron core piece 14 which is to be newly laminated abuts on a terminal end part of the segment iron core piece 14 which is laminated immediately before and rotated by 360°/m. On the other hand, when the m pieces of segment iron core pieces 14 form the annularly connected iron core piece 12, the position of the prescribed angle of the laminated iron core 10 indicates a position where the annularly connected iron core piece 12 is rotated by $\theta \cdot r°$. Here, it is supposed, as a condition, that $\theta \cdot r°$ does not correspond to 360°/m. However, as described above, the annularly connected iron core piece is not necessarily rotated by $\theta \cdot r°$.

A rotation angle of the laminated iron core 10 in the course of the above-described assembly is controlled by controlling the rotating motor 33. Further, a position of an upper surface of the laminated iron core 10 in the course of its assembly is constantly held and set to a prescribed height by lowering the laminated iron core by the thickness of the one annularly connected iron core piece 12 which is previously set in the lifting and lowering units 24 and 25 when the m pieces of segment iron core pieces 14 form the annularly connected iron core piece 12.

Then, the segment iron core piece 14 which is pushed by the pusher 49 and arranged to abut on the inside diameter guide member 30 having a function as a positioning member is caulked and laminated on the laminated iron core 10 which is now assembled by the lifting and lowering caulking die 56 (independent of the rotary laminating mechanism 35) in such a way that positions of the magnetic pole parts 11 are respectively aligned with positions of previously formed caulking parts 54. Here, the caulking parts 54 may be well-known half cutting and caulking parts or V shaped caulking parts; however, the caulking parts 54 are formed during a stage that the segment iron core piece 14 is formed. The caulking parts 54 are formed in the same positions in the radial direction of the segment iron core piece 14 and may be formed so as to meet the angle θ formed in the magnetic pole parts 11 or at equal intervals of an angle integer times as large as θ (specifically, θ·r). However, the present invention is not limited thereto.

Now, the production method for the laminated iron core by using the above-described manufacturing device 16 for the laminated iron core will be described below. Initially, the segment iron core pieces 14 which respectively have the caulking parts 54 and the n pieces of magnetic pole parts 11 formed at the pitch angle of θ° and circular arc angles obtained by dividing the angle of circumference of 360° into m are continuously formed on the belt shaped iron core material 13 by carrying out the half cutting work and the pressing back work by the dies. In this case, the longitudinal direction of the segment iron core piece 14 is allowed to correspond to the direction of width of the belt shaped iron core material 13.

The belt shaped iron core material 13 is carried to a lower position of the thrust down jig 37 by the carrying unit which accurately positions and carries the belt shaped iron core material 13 by using the pilot holes 36. The segment iron core piece 14 is separated by the thrust down jig 37 (the block 40) and mounted on a prescribed position of the mount base 42. Then, the segment iron core piece 14 mounted on the mount base 42 is carried to a laminating position (a designated position) of the rotary laminating mechanism 35, namely, a position of the caulking die 56 by the pusher 49. In this case, the segment iron core piece 14 comes into close contact with or abuts on the inside diameter guide member 30.

Then, the caulking die 56 is lowered to caulk and laminate the segment iron core piece 14 onto the segment iron core piece 14 located in a lower position and whose phase is shifted by $\theta \cdot r°$. Then, the rotary laminating mechanism 35 including the caulked and laminated segment iron core piece 14 is rotated by 360°/m. The above-described operations (the segment iron core piece 14 is carried, caulked and laminated and the laminated iron core 10 which is in the course of lamination is rotated) are repeated to form the annularly connected iron core piece 12 in which the segment iron core pieces 14 are annularly arranged.

Subsequently, the rotary laminating mechanism 35 on which the annularly connected iron core piece 12 is mounted is rotated by θ·r°, so that the laminated iron core piece 10 is formed in which the connecting parts (the abutting parts) in the circumferential direction of the upper and lower segment iron core pieces 14 are not superposed one upon another in the vertical direction. The belt shaped iron core material 13 (the outer frame) from which the segment iron core pieces 14 are removed is directly conveyed to the scrap cutter 38 to form scraps and the scraps are discharged outside by the discharge conveyor 46 and the shooter 47. The above-described processes are repeatedly carried out until the prescribed number of annularly connected iron core pieces 12 is obtained, namely, the laminated iron core 10 has a prescribed thickness.

Second Embodiment

Figure 4:
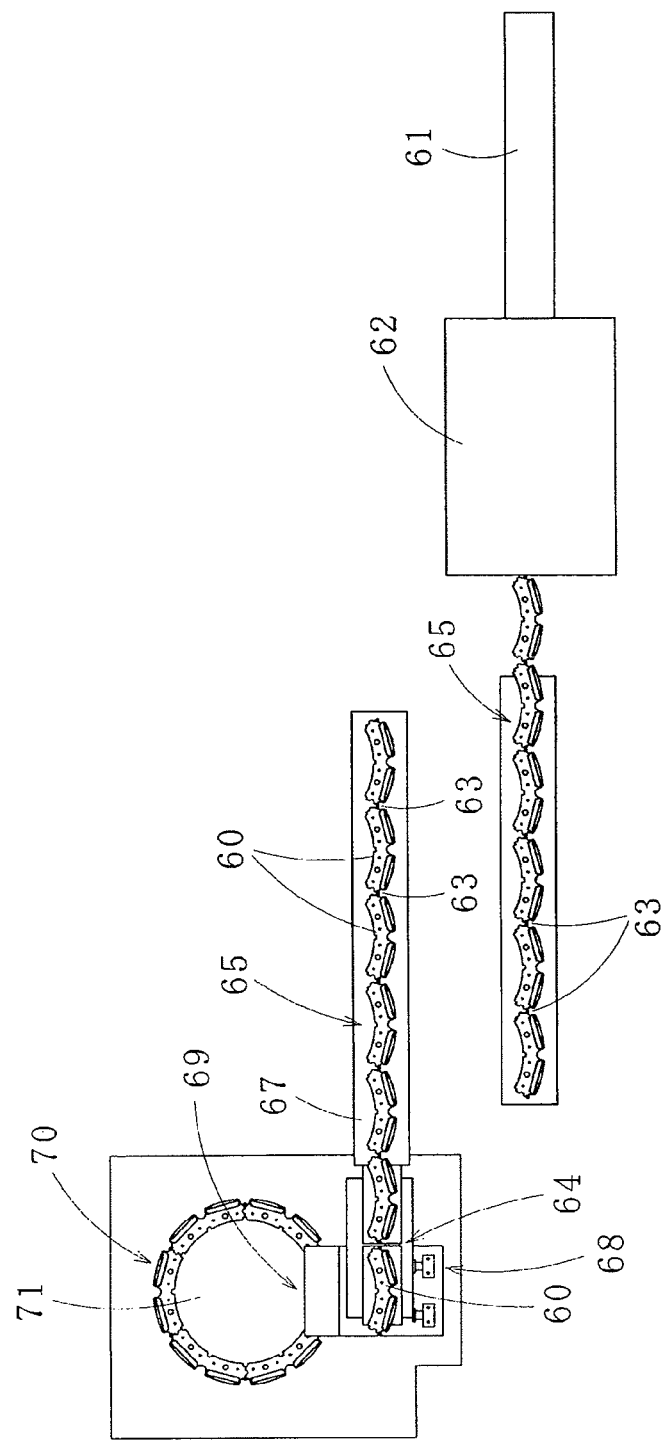
FIG. 4 is an explanatory view of a production method for a laminated iron core according to a second embodiment of the present invention.

Subsequently, by referring to FIG. 4, a production method for a laminated iron core according to a second embodiment of the present invention will be described below. In the second embodiment, a press device 62 and a caulking die 69 are independent. In the first embodiment, the belt shaped iron core material 13 having a large width is used and the longitudinal direction of the segment iron core piece 14 is allowed to correspond to the direction of width of the belt shaped iron core material 13 so as to form the plurality of segment iron core pieces 14. However, in the production method for the laminated iron core in the second embodiment, a belt shaped thin sheet material 61 made of a magnetic material whose width is a little larger than a width of a circular arc shaped segment iron core piece 60 in a radial direction is used to form a belt shaped iron core material 65 in which the segment iron core pieces 60 are respectively connected together in connecting parts 63 by the press device 62.

The belt shaped iron core material 65 is previously formed by the press device 62 and wound on a reel and stored. When the belt shaped iron core material 65 is used, the belt shaped iron core material 65 is unwound from a state that it is wound on the reel. After the segment iron core pieces 60 are respectively reformed to be flat by a reforming roller or the like as required, the belt shaped iron core material is mounted on a conveying base 67 and intermittently fed to a pusher conveying position (just above a mount base). The connecting parts 63 are cut by a cutting die 64 to form single segment iron core pieces 60. In this case, a feeding direction of the belt shaped iron core material 65 intersects at right angles to a direction that the segment iron core pieces 60 are respectively fed to the caulking die 69 by a pusher 68. In FIG. 4, a laminated iron core 70 and a rotary table 71 are shown. Further, the belt shaped iron core material 65 does not need to be wound on the reel and may be directly mounted on the conveying base 67 from the press device 62 and fed to the pusher 68.

MODIFIED EXAMPLE

The present invention is described above by using the first embodiment and the second embodiment. Now, modified examples of the above-described embodiments will be described below.

First Modified Example

Figure 5:
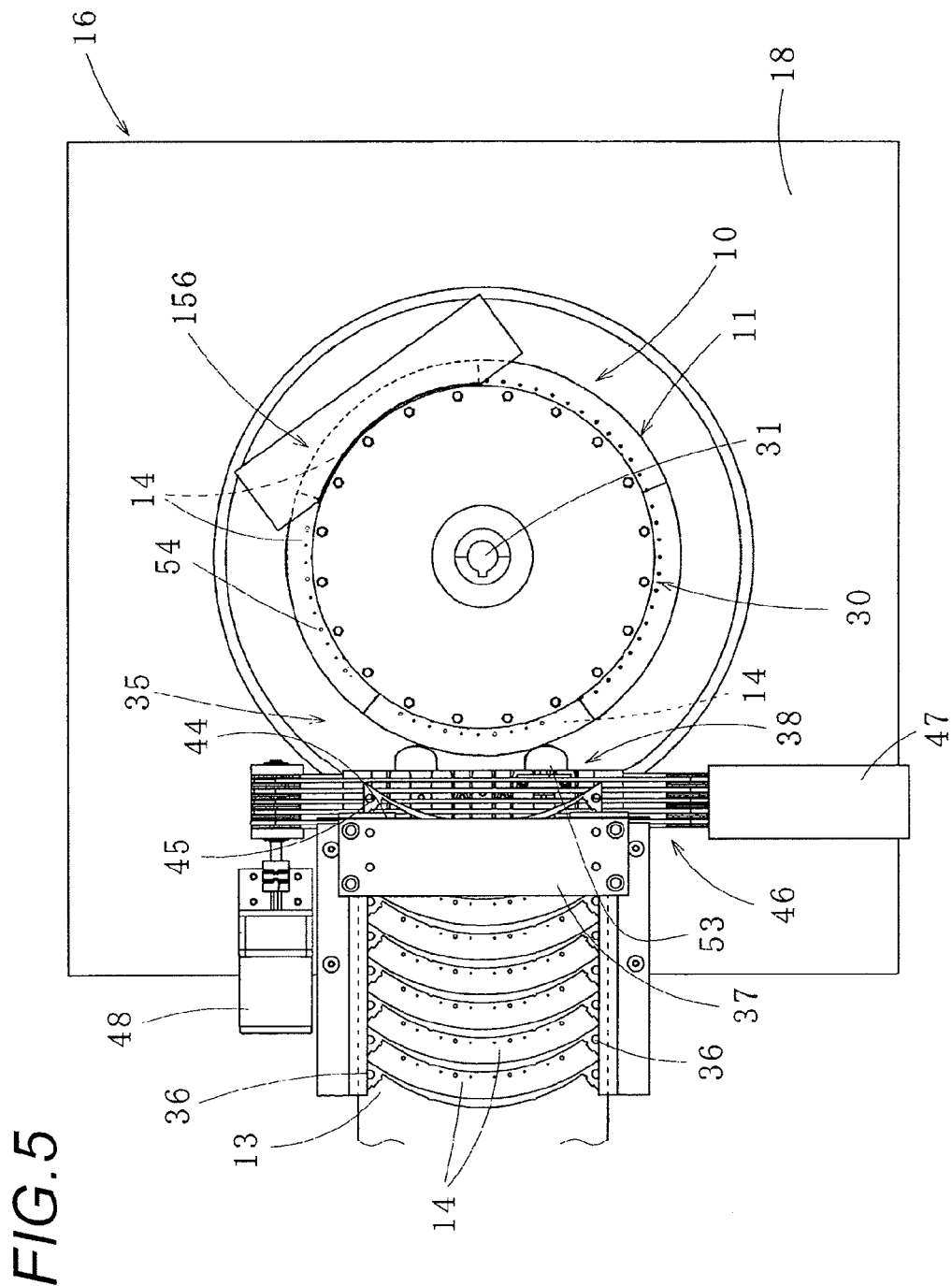
FIG. 5 is a plan view showing a main structure of a manufacturing device for a laminated iron core according to a first modified example.

FIG. 5 is a plan view showing a main structure of a manufacturing device for a laminated iron core according to a first modified example that the first embodiment is modified. Component elements having the same structures or functions as those of the first embodiment are designated by the same reference numerals and a detailed explanation thereof will be omitted. The structure of the first modified example is different from that of the first embodiment in a point of view that a caulking die 156 is provided in place of the caulking die 56. For simplicity, the first modified example is described by using the first embodiment; however, the first modified example may be applied to the second embodiment.

The caulking die 156 is arranged in a different position from a position where the segment iron core piece 14 is carried by the iron core piece push out member 53 of the pusher 49. In the present first modified example, the caulking die 156 is arranged at a position where the segment iron core piece 14 is rotated twice (namely 144°). Initially, the segment iron core piece 14 carried to the rotary laminating mechanism 35 by the pusher 49 is arranged in a state where the segment iron core piece abuts on the inside diameter guide member 30 having the function as the positioning member. After that, the rotary laminating mechanism 35 including the positioned segment iron core piece 14 is rotated by 360°/m (72° in the present modified example). Then, the next segment iron core piece 14 is carried to the designated position of the rotary laminating mechanism 35 by the pusher 49. Further, the rotary laminating mechanism 35 is rotated by 360°/m (72° in the present modified example). Thus, the initially carried segment iron core piece 14 is conveyed to a caulking and laminating position. The segment iron core piece 14 conveyed to the caulking and laminating position is caulked and laminated on the laminated iron core 10 in the course of assembly by the lifting and lowering caulking die 156.

The position of the caulking die 156 is not limited to the position of the above-described example. When the position of the caulking die 156 is different from the position where the segment iron core piece 14 is initially carried, any position may be used. Preferably, the caulking die 156 may be arranged at a position where the segment iron core piece 14 may be caulked and laminated on the one segment iron core piece 14 which forms the annularly connected iron core piece (namely, a position k times as large as 360°/m; in this case, k indicates a natural number and satisfies 1≤k<m). However, the caulking die 156 may be arranged at a position where the segment iron core piece can be caulked and laminated on the plurality of segment iron core pieces 14 adjacent in the circumferential direction which form the annularly connected iron core piece 12.

In the first embodiment, a caulking and laminating operation cannot be carried out until a positioning operation of the segment iron core piece 14 and the inside diameter guide member 30 is completed. On the other hand, according to the present first modified example, the segment iron core piece 14 already aligned by the inside diameter guide member 30 is carried to the position of the caulking die 156. The rotary laminating mechanism 35 and the caulking die 156 are independently provided and can be separately controlled. Accordingly, the positioning operation of the segment iron core piece 14 carried by the pusher 49 and the inside diameter guide member 30 is not waited for, but the segment iron core piece 14 which is previously arranged in the rotary laminating mechanism 35 can be caulked and laminated, for instance, while the segment iron core piece 14 is carried. In this case, a period that the segment iron core piece 14 is carried or positioned and a period that the different segment iron core piece 14 arranged in the rotary laminating mechanism 35 is caulked and laminated may be at least partly overlapped.

Second Modified Example

Figure 6:
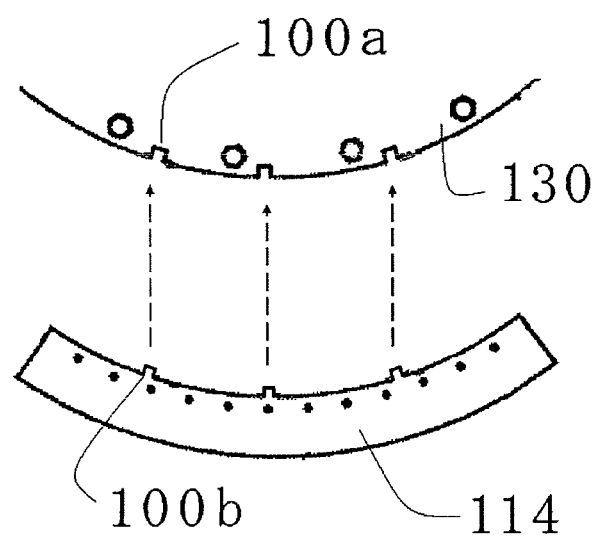
FIG. 6 is an enlarged view of a segment iron core piece and an inside diameter guide member according to a second modified example.

FIG. 6 is an enlarged view of a segment iron core piece and an inside diameter guide member according to a second modified example. In the second modified example, since only forms of the segment iron core piece and the inside diameter guide member are changed, the second modified example may be applied to any of the first embodiment, the second embodiment and the first modified example.

FIG. 6 is a diagram showing a segment iron core piece 114 before the segment iron core piece is carried by the pusher 49 and an inside diameter guide member 130. In an inner peripheral side of the segment iron core piece 114, a plurality of protruding parts 100b are formed. In the inside diameter guide member 130, recessed parts 100a are formed which correspond to the protruding parts 100b of the segment iron core piece 114. In the segment iron core piece 114 carried by the pusher 49, the protruding parts 100b thereof are fitted to the recessed parts 100a of the inside diameter guide member 130, so that the segment iron core piece 114 is more accurately positioned. At least one protruding part 100b may be provided. The one protruding part 100b can position the segment iron core piece. When a plurality of protruding parts 100b is formed, a positioning accuracy is more improved. Further, when the segment iron core piece 114 is rotated, the segment iron core piece 114 can be prevented from shifting in the circumferential direction. Further, when the segment iron core pieces 114 form a rotor, the protruding part 100b can be allowed to function as a key part for stopping a rotation of the shaft.

In the above-described example, the protruding parts are formed in the segment iron core piece and the recessed parts are formed in the inside diameter guide member. Conversely, the recessed parts may be formed in the segment iron core piece and the protruding parts may be formed in the inside diameter guide member. Further, both the recessed parts and the protruding parts may be formed in the segment iron core piece and the protruding parts and recessed parts corresponding thereto may be formed in the inside diameter guide member. Further, forms of the protruding and recessed parts are not limited to rectangular forms as shown in FIG. 6, and semicircular forms or other complicated forms may be used. Namely, when irregularities can be used for positioning, any form may be used.

The present invention is not limited to the above-described embodiments and a composition thereof may be changed within a scope that does not change the gist of the present invention. For instance, in the embodiment, the motor is used as a driving source, however, an actuator which is driven by a hydraulic source or a pneumatic source may be used. Further, the inside diameter guide member is formed with the plurality of rod materials as main members. However, the inside diameter guide member may be formed in such a way that annular or a plurality of circular arc shaped materials are arranged. In the above-described embodiments, the production method for the laminated iron core of the rotor is described. However, the present invention may be applied even to a laminated iron core of a stator in which magnetic poles are located outside or inside in the radial direction.

This application is based on Japanese Patent Application No. 2012-233832 of Japanese Patent Application filed on Oct. 23, 2012, the contents of which are incorporated herein by reference.

INDUSTRIAL APPLICABILITY

According to the production method for the laminated iron core of the present invention, the segment iron core pieces are laminated in annular forms outside the die that manufactures the segment iron core pieces so that the device may be more miniaturized and a press speed may be improved.

REFERENCE SIGNS LIST

10: laminated iron core
11: magnetic pole part
11a: magnet insert hole
12: annularly connected iron core piece
13: belt shaped iron core material
14: segment iron core piece
16: manufacturing device for laminated iron core
17: support member
18: base plate
19: lower plate
20: lifting and lowering plate
22, 23: lifting and lowering rod
24, 25: lifting and lowering unit
27: bearing
28: rotary plate
29: core mount base
30: inside diameter guide member
30a: rod material
30b: disk
31: shaft
32: coupling
33: rotating motor
33a: support plate
33b: support rod
34: output shaft
35: rotary laminating mechanism
36: pilot hole
37: thrust down jig
38: scrap cutter
40: block
42: mount base
43, 44: shearing blade
45: scrap
46: discharge conveyor
47: shooter
48: motor
49: pusher
50: decelerating motor
51: arm
52: moving forward and backward member
53: iron core piece push out member
54: caulking part
56: caulking die
60: segment iron core piece
61: thin sheet material
62: press device
63: connecting part
64: cutting die
65: belt shaped iron core material
67: conveying base
68: pusher 69: caulking die
70: laminated iron core
71: rotary table
100a: recessed part
100b: protruding part
114: segment iron core piece
130: inside diameter guide member
156: caulking die

The invention claimed is:

1. A production method for a laminated iron core, the production method comprising:
   a mounting process that a plurality of segment iron core pieces which respectively have caulking parts and n pieces of magnetic pole parts formed at a pitch angle of θ° and respectively have circular arc angles obtained by dividing 360° as an angle of circumference into m are separated from a belt shaped iron core material and mounted on a mount base;
   a carrying process that the segment iron core pieces mounted on the mount base are carried one piece by one piece to a designated position in a rotary laminating mechanism by a pusher;
   a first rotating process that the rotary laminating mechanism including the segment iron core piece therein is rotated by 360°/m;
   a forming process that the mounting process, the carrying process and the first rotating process are repeated m times to form an annularly connected iron core piece in which m pieces of the segment iron core pieces are annularly arranged; and
   a caulking and laminating process that during the forming process, the caulking part of the segment iron core piece is caulked to laminate the segment iron core piece on the segment iron core piece adjacent in a direction of lamination, wherein
   the forming process is repeated to form a caulked and laminated iron core having a prescribed thickness,
   where m and n are integers of 2 or larger, and θ·n·m=360°.

2. The production method for the laminated iron core according to claim 1, further comprising:
   a second rotating process that the rotary laminating mechanism on which the annularly connected iron core piece is mounted is rotated by θ·r°, wherein
   the forming process and the second rotating process are repeated to form the caulked and laminated iron core having the prescribed thickness,
   where r is a natural number and is not a number integer times as large as n.

3. The production method for the laminated iron core according to claim 1, wherein
   the caulking and laminating process is carried out after the carrying process to caulk and laminate the segment iron core piece before the carried segment iron core piece is rotated by the first rotating process.

4. The production method for the laminated iron core according to claim 1, wherein
   in the caulking and laminating process, the segment iron core piece is caulked and laminated in a position different from the position where the segment iron core piece is carried in the carrying process.

5. The production method for the laminated iron core according to claim 4, wherein
   in the caulking and laminating process, the segment iron core piece which is rotated k times in the rotary laminating mechanism in the first rotating process is caulked and laminated,
   where k indicates a natural number and satisfies 1≤k<m.

6. The production method for the laminated iron core according to claim 4, wherein
   while a first segment iron core piece is carried in the carrying process, a second segment iron core piece is caulked and laminated in a position different from the position where the second segment iron core piece is carried in the rotary laminating mechanism in the caulking and laminating process.

7. The production method for the laminated iron core according to claim 1, wherein
   the rotary laminating mechanism is provided with an inside diameter guide member which determines an inside diameter of the laminated iron core, and the segment iron core piece is pushed by the pusher to abut on the inside diameter guide member and the segment iron core piece is carried to a laminating position of the rotary laminating mechanism.

8. The production method for the laminated iron core according to claim 7, wherein
   a recessed part or a protruding part is formed in an inner peripheral side of the segment iron core piece, and
   a protruding part or a recessed part corresponding to the recessed part or the protruding part of the segment iron core piece is formed in the inside diameter guide member.

9. The production method for the laminated iron core according to claim 1, wherein
   before the mounting process, a longitudinal direction of the segment iron core piece is allowed to correspond to a direction of width of the belt shaped iron core material, and then, the segment iron core piece is half cut, pressed back and held by an outer frame of the belt shaped iron core material, and
   in the mounting process, the segment iron core piece is carried to an upper position of the mount base, separated from the belt shaped iron core material and blanked off onto the mount base.

10. The production method for the laminated iron core according to claim 9, wherein
    the outer frame from which the segment iron core piece is blanked off is cut to scraps by a scrap cutter and discharged outside a system.

11. The production method for the laminated iron core according to claim 1, wherein
    the belt shaped iron core material is formed by connecting a plurality of segment iron core pieces together with connecting parts, and
    the belt shaped iron core material is carried to a part just above the mount base and cut at the connecting parts, so that the segment iron core pieces are separated from the belt shaped iron core piece and arranged on the mount base.

12. The production method for the laminated iron core according to claim 11, wherein
    a feeding direction of the segment iron core piece by the pusher intersects at right angles to a feeding direction of the belt shaped iron core material.

13. The production method for the laminated iron core according to claim 11, wherein
    the belt shaped iron core material is wound on a reel.

* * * * *